United States Patent [19]

Mann et al.

[11] Patent Number: 4,651,526
[45] Date of Patent: Mar. 24, 1987

[54] HYDROSTATIC DRIVE SPECIALLY FOR MIXING DRUMS OF READY-MIXED CONCRETE VEHICLES

[75] Inventors: Egon Mann; Hans-Peter Bach, both of Friedrichshafen, Fed. Rep. of Germany

[73] Assignee: Zahnradfabrik Friedrichshafen AG, Friedrichshafen, Fed. Rep. of Germany

[21] Appl. No.: 589,068
[22] PCT Filed: May 13, 1983
[86] PCT No.: PCT/EP83/00122
§ 371 Date: Feb. 29, 1984
§ 102(e) Date: Feb. 29, 1984
[87] PCT Pub. No.: WO84/00409
PCT Pub. Date: Feb. 2, 1984

[30] Foreign Application Priority Data

Jul. 16, 1982 [DE] Fed. Rep. of Germany ....... 3226631

[51] Int. Cl.[4] ............................................. F16D 31/02
[52] U.S. Cl. ........................................ 60/456; 92/144
[58] Field of Search ............. 60/456; 91/499; 92/144; 418/86, 101

[56] References Cited

U.S. PATENT DOCUMENTS

| 2,476,041 | 7/1949 | Happe et al. | 418/101 |
| 3,026,814 | 3/1962 | Binhack | 91/499 |
| 3,744,377 | 7/1973 | Lauck | 91/499 |
| 4,362,390 | 12/1982 | Fischer | 366/61 |
| 4,461,147 | 7/1984 | Myers | 60/444 |

FOREIGN PATENT DOCUMENTS

| 1082134 | 5/1960 | Fed. Rep. of Germany . | |
| 1298819 | 7/1969 | Fed. Rep. of Germany . | |
| 2931969 | 2/1981 | Fed. Rep. of Germany . | |
| 389818 | 7/1965 | Switzerland | 418/86 |
| 865146 | 4/1961 | United Kingdom . | |
| 2062187 | 5/1981 | United Kingdom | 60/456 |

OTHER PUBLICATIONS

Sundstrand, Hydro-Transmission Application Manual, 11/79, p. 28.

Primary Examiner—Edward K. Look
Attorney, Agent, or Firm—Hayes, Davis & Soloway

[57] ABSTRACT

A transmission casing wherein is inserted a flooded hydromotor has together with an annular space traversed by a forced flow a double function both as oil cooler and as receiver container of the externally situated pumps. Both the working substance flowing out from said hydromotor and the flushing oil that is conveyed past it are led together on intermediate ribs and vanes in a flow channel meanderingly passed about said hydromotor to the filling pump feed pipe. Intermediate ribs and vanes are connected or integral with the transmission casing that has many ribs and can be exposed to a cooling current directed as needed. Said annular space is spatially separated by stop plates from mechanical gear portions eventually situated in front, but is at the same time oil sump thereof by means of a connecting opening.

21 Claims, 4 Drawing Figures

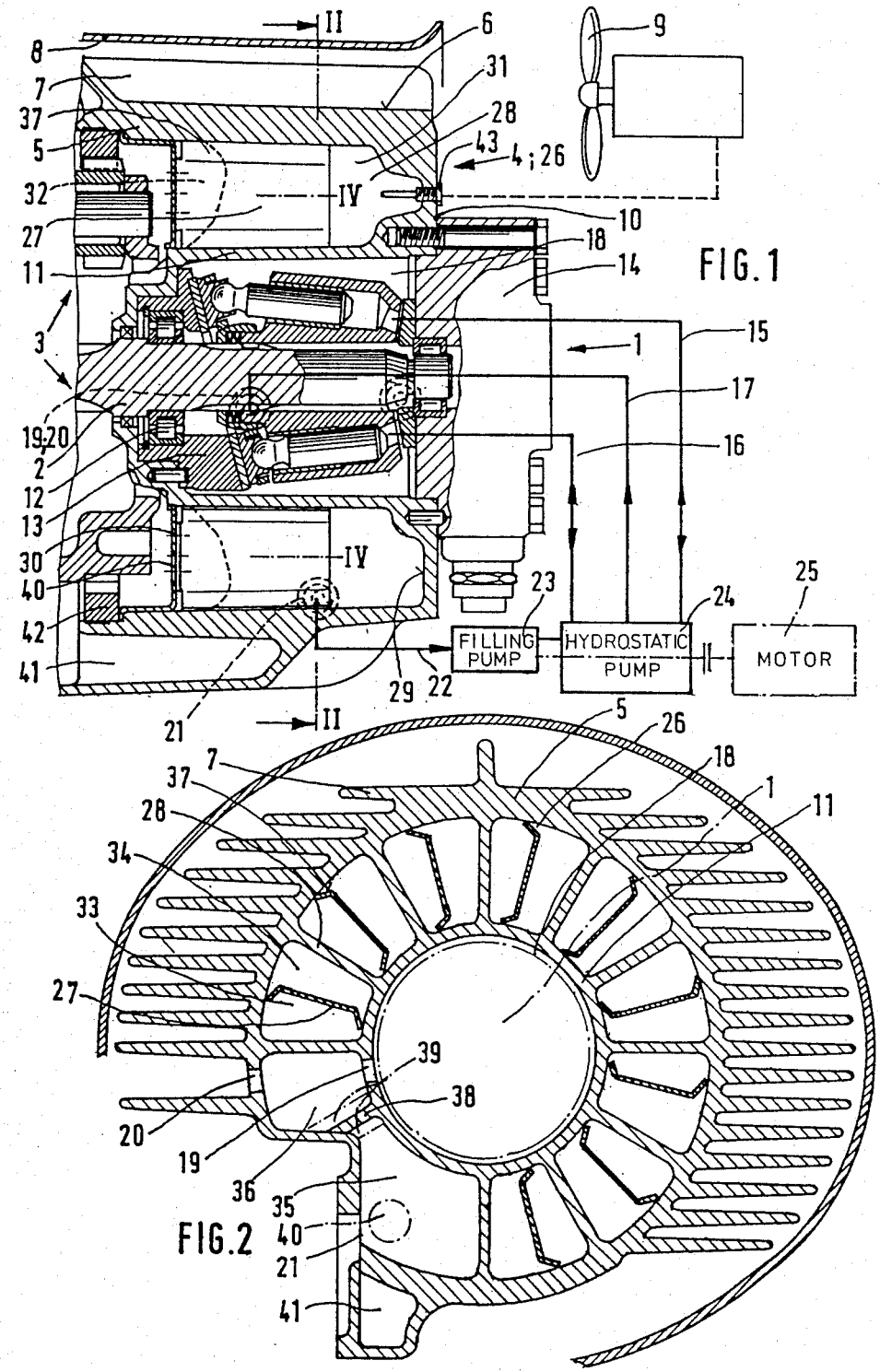

HYDROSTATIC DRIVE SPECIALLY FOR MIXING DRUMS OF READY-MIXED CONCRETE VEHICLES

This invention relates to a hydrostatic drive, specially for mixing drums of ready-mixed concrete vehicles. German laid-open application No. 29 31 969 has disclosed solutions for simplifying and compacting the constructional assembly of hydrostatic drives by incorporating a hydromotor into the transmission or by using the same as a cooling surface and as common oil conservator, thereby reducing the cooling expenses. However, the structure of the transmission casing shown in said publication, which has a stabilizing space situated before the hydromotor and an uncontrolled oil movement preferably controlled as "spirally rotating collecting current", still does not suffice to meet the requirements of reducing expense and compaction. In order actually to obtain a satisfactory cooling effect even with intensive use and high outside temperatures, there must be provided in this arrangement either larger dimensions for the transmission or higher ventilating effects than are desirable in many cases. To intensify the oil movement by still stronger splashings in the mechanical gear portion likewise cannot be considered.

The problem to be solved by the invention stated in claim 1 is to provide a hydrostatic drive, which requires low energy and serves the purpose with a very small cooling surface without increasing the splashing losses in the mechanical gear portion and which can be economically combined in a compact structure with added mechanical transmission stages.

Said problem is solved by the features indicated in the characteristic part of claim 1. It is thereby obtained that the oil movement in the cooling area be no longer uncontrolled and that a stabilizing space be no longer needed to avoid effects of the splashing in the mechanical gear portion. The oil movement now takes place only in an annular space designed in the manner of a heat exchanger that at the same time makes use only of the area of the transmission casing radially surrounding the hydromotor and completely oil-flooded, that is, it makes unncessary any spacing in front of the hydromotor to a partition that hitherto provided the stabilizing space. It is further obtained that the forced flow through the annular space depends directly on the operation of the pumps and that strong flow changes cannot occur in the remaining front space due to changing direction of the currents and differences of charge. In addition it is obtained that the oil to be cooled cannot accumulate in the corners of a stabilizing space, but must instead completely and substantially simultaneously pass the cooling area, the changing amounts of working oil from the hydromotor becoming always entirely mixed with the amount of flushing oil that is directed past the hydromotor. It is moreover obtained that as consequence of the complete filling of the annular space the zones of the transmission situated higher in the annular space be also oil-wetted in the same manner and, unlike in the known stabilizing space with incomplete filling, the upper area be possibly less immersed in oil or that there locally predominate only slight oil flow and thus poorer heat transfers.

Advantageous embodiments of the invention are described in the sub-claims.

According to one embodiment the front end of the annular space that now extends only over the length of the hydromotor can be at the same time an end to a gear space where entirely different oil currents can be present.

According to another embodiment the splashing effects of the hydromotor can be kept off by the forced flow in the annular space, there being possible high, uniform oil speeds in the area of the outer wall, and yet, depending on the amount and direction, adequate oil can flow off the hydromotor.

According to another embodiment the oil repeatedly has to accomplish its path through the annular space at high speeds, and that many exchange surfaces at high differential temperatures can be available to the heat exchanger.

According to another embodiment free flow of residue can be possible through each one of the annular-space chambers from the inlet to the outlet and that the inlet and outlet can be parallel in a manner favorable for assembly.

According to another embodiment the spacing gaps of the radial vanes permit, by opposing divergence, an uncomplicated structure and eventually cross-sectional adaptations to different pumping powers without it being necessary to change the sectioning of the annular space.

According to a further embodiment approximately the same high speeds exist in the spacing gaps as in the chambers so that high pressure losses or accumulations are not possible therein.

According to another embodiment, the radial vanes make possible the heat transfer to the cooled outer walls extensively and without insulating interspaces.

According to another embodiment, none or insignificant secondary currents can flow a short way to the outlet.

According to another embodiment, also in the sectioning radial vane no short circuit can be possible between inlet and outlet, and yet that the possibility of simple assembly of the radial vane won't be impaired.

According to a still further embodiment, the annular space can always be completely flooded with oil without keeping higher the level in the mechanical gear portion.

According to another embodiment, a connecting opening between the mechanical and hydraulic gear portion such as a gap or bore in the stop plate can be present so that the mechanical gear can be always supplied also from the hydrostatic circulation.

According to another embodiment, the stop plate can be inserted in the transmission without screw and without additional outer flange connection.

According to another embodiment, the anti-rotation mechanism of other gear portions can be also used, for instance, by jointly using a hollow wheel to compress and lock the stop plate.

According to a still further embodiment, the amount of flushing oil directed past the hydromotor can be passed through the annular space while mixing with the working oil from the hydromotor.

According to another embodiment the heat transfer from the core of the annular space to the outer air become intensified with low gear weight.

According to another embodiment the outer surface intensively and with relative uniformity emit the heat even in the idle state of the vehicle concerned.

According to another embodiment the outer surface can be on the one hand protected from soiling and on the other intensively cooled as needed while no possibility of deflection is left to the cool-air current.

According to another embodiment the ventilator can operate automatically or optionally independently of the operation of the hydromotor.

According to a still further embodiment the danger of soiling can be reduced and that the surface can be enlarged as needed.

According to still another embodiment in spite of a rigidly joined assembly, the gear portion through which the forced flow runs can be produced with favorable manufacturing conditions and easily.

According to a final embodiment, use be also possible in a manner known per se in a mixing drum drive.

The invention is extensively explained herebelow with reference to diagrammatic drawings.

FIG. 1 shows a longitudinal section through a gear portion traversed by forced flow that surrounds a hydromotor, said gear portion communicating with the external hydrostatic pump or the filling pump thereof.

FIG. 2 shows a cross section through the transmission portion with the outer ribs and bottom exit of the working substance in the direction of the filling pump.

Figure 4:
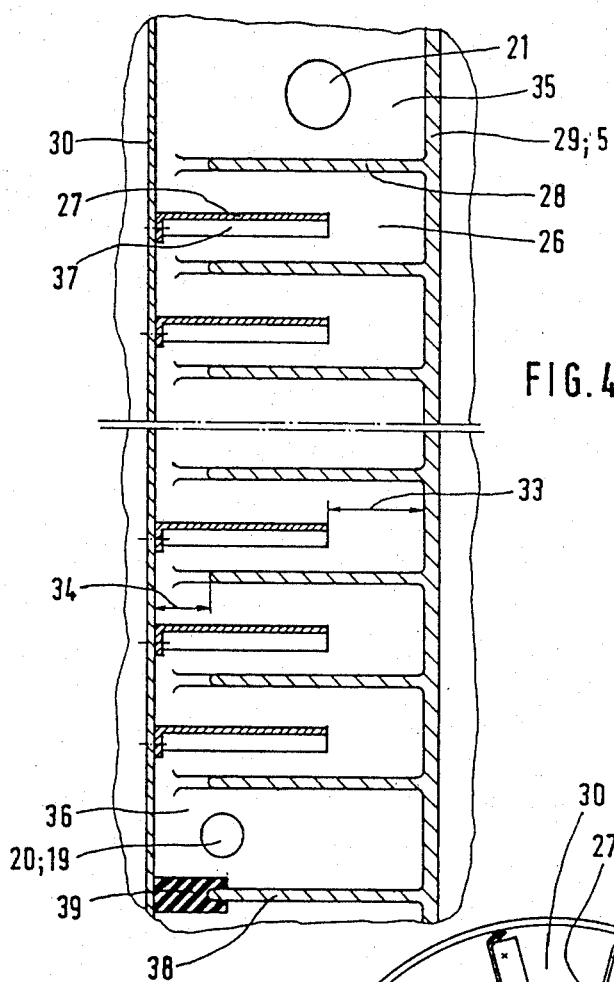
FIG. 4 shows in the form of a development an arrangement of the current-steering device in the example of the arrangement of the radial vanes and inner ribs of the transmission casing.

FIG. 1 is a shaft 2 driven by a hydromotor 1, which shaft, for instance, drives a mixing drum (not shown) or the like via a mechanical gear 3 and is surrounded by a portion of the transmission, annular space 4, through which a forced current flows. The transmission casing 5 has on its outer side a cooling surface 6 with outer ribs 7 which in the example is surrounded by a baffleplate 8 in order to concentrate the cool-air current that comes from a blower 9 axially situated before the transmission casing 5. For accommodating the hydromotor the transmission casing 5 has on its outer front side a flange 10, an inner connecting tube 11 covering the hydromotor 1 and projecting at its inner end into the transmission casing 5, a shaft bearing 12 sealed toward the mechanical gear portion 3 and resting against inclined disc 13 of the hydromotor 1. Situated before the flange 10 is a valve block 14 through which two high-pressure feed pipes 15, 16 and the pump waste-oil duct 17 respectively reach the hydromotor 1. A flushing valve (not shown) in the valve block 14 allows the portion of working substance not needed in the hydromotor 1 to discharge in an annular space 18 between the hydromotor 1 and the inner connecting tube 11 where it again mixes with the exhaust flow of the hydromotor 1 and together therewith overflows in the outer annular space 4 of the transmission casing 5. The pump waste-oil pipe 17 also discharges from the outside into the annular space 4. According to the invention, the annular clearance 18 or the inner connecting tube 11 that defines it is surrounded by an annular space 4 through which the working substance that flows in through the oil inlet openings 19, 20 is conveyed in the direction toward the outlet opening 21 or (via the filling pump pipe 22) to the filling pump 23 without changing wall movements occurring in this annular space 4 due, for instance, to level differences or flow irregularities. Independently of the rotation direction or speed of the hydromotor 1, the annular space 4 is always kept completely full and thus the hot flow to the cooling surface 6 is stabilized or intensified. The hydrostatic pump 24 can thus directly, that is, without it being necessary to pass a separate cooler, return the removed oil into the hydromotor or the cooling circuit 14, 18, 1, 4, 21, 23 as long as its driving motor 25 runs. The subdivision according to the invention of the annular space 4 into separate chambers 26 by means of radial vanes 27 or 28 which interleave starting respectively from alternate stop plates 30 or 29, (serving as end walls for the annular spaces) has recommended itself as a specially effective step for increasing the heat flow. Here each intermediate vane 27 is axially inserted with front-side clearance between two intermediate ribs 28. While the chosen axial length of the radial vanes 27, 28 is less than the length of the annular space 4, there respectively remains before the stop plates 29, 30 an outlet cross section 31, 32 for reversing the working substance that flows along the vanes 27, 28 to the respective opposite direction. Thus there results a flow pattern that is serpentine in development having strong radial flow in the chambers 26 toward the cooling surface 6, since the individual cross sections 33, 34 of the chambers are enlarged toward the outer wall.

In FIG. 2 the course according to the invention of the forced current in the annular space 4 is illustrated in a cross section of the drive with the vanes 27, 28 and the outer ribs 7. The outlet 21 to the filling pump pipe 22, after which is preferably inserted a filter (not shown) directly screwed on the transmission 5, is here at the side of a low situated large collecting chamber 35, which has no intermediate vane starting from the opposite stop plate 30. Adjacent in clockwise direction is the inlet chamber 36, likewise free of intermediate vane, in which discharge the oil inlets 19 (from the annular clearance 18) and 20 (from the pump waste-oil pipe 17). From there on, further circulating in clockwise direction, all normal chambers 26 have each around the hydromotor 1 an axially inserted intermediate vane 27, which with lateral projecting surfaces 37 yieldably abuts on the sidewalls of the chambers and is firmly held only on the front side facing the mechanical gear portion 3 by the removable stop plate 30. Both the intermediate ribs 28 integrally connected with the transmission casing 5 and the intermediate vanes 27 force the working substance that flows to the outlet 21 to multiple crossings of the intensively blasted cooling surface 6. To avoid refluxes between the collecting chamber 35 and the inlet chamber 36, a sealing vertical section 39 is inserted in a partitioning radial vane 38 disposed here in the lowermost position. Due to the intensive heat dissipation caused by the tightly arranged outer ribs and the intermediate ribs 28 integral therewith, the same as by the closely abutting intermediate vanes 27 and the transmission casing 5, the oil loses much of its heat in a very short way toward the outside. To avoid unnecessary pressure losses, the passage cross sections 31, 32 can be here dimensioned the same as, or larger than, the cross sections of the chambers 26. The integral connection of the intermediate ribs 28 to the transmission casing 5 is here advantageous not only for a better heat conduction but also with regard to the strength of the drive housing that supports the hydromotor 1. As long as the hydromotor 1, like in the example, is coupled with a mechanical gear, there can be provided by means of a connecting opening 40 a possibility of communication for both oil amounts from the collecting chamber 35 to the oil sump of the mechanical gear 3 so that only a common oil content has to be watched. By means of the gear elements 42 (such as a hollow wheel) firmly secured in the transmission casing 5, the stop plate 30, together with the radial vanes 27 that it holds, can also be advantageously locked axially and radially and sealed on the periphery without requiring an intermediate flange of its own. In case large amounts of oil have to be cooled or the cooling power with the above described intermediate vane arrangement still does not suffice, there is the possibility, without departing from the invention, of using instead of the intermediate vanes, separate pipes and adequately interconnecting them at the entrance and exit sides so that there result several parallel partial currents which, even if their period of dwell in the cooling surface area is shorter, their differential temperature toward the outside could be higher so that despite higher oil throughputs, a still sufficient elimination of heat will be possible. Since, in the case of the mixing drive, chosen as example, there is needed only a sporadic use of the hydromotor 1 and therefore hardly any heat results in the remaining time, the blower 9 is controllable when needed, for instance, by a thermal switch 43 immersed in the oil, and can easily be made to operate when in said low load periods to deal with momentary excess heat amounts.

Figure 3:
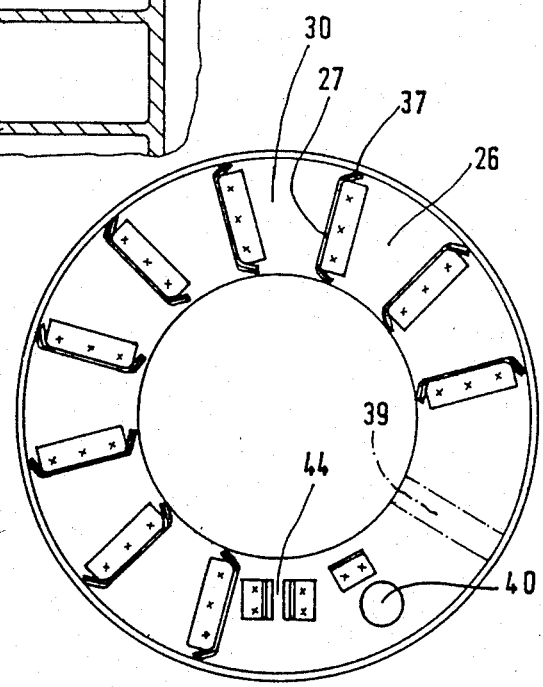
FIG. 3 shows in front view a stop plate at the gear side having mounted thereon radial vanes for insertion between the inner ribs of the transmission casing.

In FIG. 3 is shown the arrangement of the intermediate vanes 27 on the stop plate 30 at the gear side. Defective assembly is prevented by means of stop pockets 44. The connecting opening 40 comes to lie at the bottom.

In FIG. 4 is shown in development the arrangement of the flow-steering devices in the example of the radial vanes 27, 28 for multiple crosscurrent with the inlet and outlet openings 19, 20, 21. Here the stop plate 29 integral with the transmission casing 5 is below and the intermediate ribs 28 project upwardly. At the same time there result separate chambers 26 where the intermediate vanes 27 mounted on the upper stop plate 30 extend to about half the length of the intermediate ribs 28. The beginning of the forced flow starting at the inlet opening 18 is separated watertightly from its end at the outlet opening 21 by the partitioning radial vane 38 with the sealing vertical section 39 superposed on it. By the alternate arrangement of intermediate ribs 28 and intermediate vane 27, the flow from the inlet 19 or 20 to the outlet opening 21 undergoes a meandering course around the hydrostatic gear portion. The enlarged cross sections of the inlet and collecting chamber 35 or 36 uninterrupted by intermediate vanes prevent accumulations in the inlet and outlet areas.

The design according to the invention of a hydrostatic drive with integrated circulating oil cooling is obviously not limited to the cases where the oil circulation occurs in a conventional hydromotor or an external filling pump. Instead of this, the same effects can also be obtained in other pumping devices and sources of heating with the transmission design according to the invention.

| Reference Numerals | |
|---|---|
| 1. Hydromotor | 23. Filling pump |
| 2. Shaft | 24. Hydrostatic pump |
| 3. Mechanical gear portion | 25. Drive motor |
| 4. Driving gear traversed by forced current (annular space) | 26. Flow chambers |
| | 27. Radial vanes (intermediate) |
| | 28. Radial vanes (intermediate ribes on 5) |
| 5. Transmission casing | 29. Stop plate on 5 |
| 6. Cooling surface | 30. Stop plate on 27 |
| 7. Outer ribs | 31. Passage cross section before 29 |
| 8. Baffleplate | 32. Passage cross section before 28 |
| 9. Ventilator | 33. Individual cross sections above 27 |
| 10. Flange | |
| 11. Inner connecting pipe | 34. Individual cross sections below 27 |
| 12. Shaft bearing | 35. Collecting chamber |
| 13. Inclined disc of 1 | 36. Inlet chamber |
| 14. Valve block | 37. Lateral projecting surfaces of 27 |
| 15. High-pressure feed pipe | |
| | 38. Partitioning radial vane |
| 16. High-pressure feed pipe | 39. Vertical section between 38 and 30 |
| 17. Pump waste oil pipe | 40. Connecting opening of 35 and 3 |
| 18. Annular space around 1 | 41. Oil sump of 3 |
| 19. Oil inlet opening of 18 | 42. Driving element locked in 3 (for ex. a hollow wheel) |
| 20. Oil inlet opening of 17 | |
| 21. Outlet opening | 43. Thermal switch |
| 22. Filling pump pipe | 44. Stop pocket |

We claim:
1. In a hydrostatic drive comprising:
a mechanical gear transmission (3), situated adjacent a hydromotor (1) having a central axis,
an annular space, defined by a connecting pipe (11) that surrounds the hydromotor (1), a transmission casing (5), and first and second opposed end walls (29, 30),
said annular space serving as a collecting and cooling container for a working fluid of the hydromotor which is at the same time a lubricant for the mechanical gear transmission,
said transmission casing (5) having cooling surfaces (7) in the area of said annular space (4) on the exterior thereof,
the improvement wherein said annular space (4) is divided into chambers (26) by substantially longitudinally oriented radial vanes (27, 28) which are substantially orientated on planes extending from said axis, said vanes with said end walls defining flow passages (31, 32) interconnecting adjacent pairs of chambers (26) alternately adjacent said first end wall and adjacent said second end wall to define a single meandering serpentine flow channel completely encompassed by said transmission casing (5) and having only one inlet and only one outlet through said annular space (4) through which working fluid can be passed by forced flow through said channels in progressive alternating directions substantially parallel to said axis, said flow channel providing complete working fluid flow through said annular space without allowing accumulation in the corners, and a filling pump (23) maintaining said annular space (4) completely full with working fluid.

2. A drive according to claim 1, wherein said end walls (29,30) extend radially adjacent axial ends of the hydromotor.

3. A drive according to claim 2, wherein said passages (31, 32) each have a cross-section of approximately the same area as the passage between adjacent radial vanes.

4. A drive according to claim 2, wherein said flow channel begins at an inlet chamber (36) that opens toward said inner connecting tube (11) and is between two radial vanes (28) of said annular space (4) said flow channel ends at a collecting chamber (35) having the outlet opening (21) connected to the filling pump (23) and separated from said inlet chamber (36) by a partitioning radial vane (38) closely abutting both end walls of said annular space (4).

5. A drive according to claim 4, wherein said partitioning radial vane (38) has dimensions corresponding to the remaining radial vanes (27, 28), with the spacing thereof from the end wall it does not abut being closed by a flexible sealing vertical section (39).

6. A drive according to claim 2, wherein said radial vanes are sealed against the end wall which they abut.

7. A drive according to claim 6, wherein said radial vanes (28) secured to one said end wall (29) are connecting ribs between said transmission casing (5) and said inner connecting tube (11) and are integral therewith.

8. A drive according to claim 7, wherein said radial vanes (27) secured to the other end wall (30) have laterally projecting surfaces (37) resiliently abutting against said transmission casing (5) and said inner connecting tube (11).

9. A drive according to claim 7, wherein both the portions of said transmission casing (5) that subdivide said annular space (4) and those that surround it are made of aluminum and said casing is provided with outer ribs (7).

10. A drive according to claim 9, wherein said drive includes a blower and said outer ribs (7) are located to receive air current produced by said blower (9).

11. A drive according to claim 10, wherein said air current is directed by means of a housing (8) adjacent said outer ribs (7).

12. A drive according to claim 10, wherein a thermal switch (43) in said annular space (4) is connected to control operation of said blower.

13. A drive according to claim 9, wherein said outer ribs (7) are separate ribs projecting predominantly horizontally from said transmission casing (5).

14. A drive according to claim 9, wherein said portion of said transmission casing (5) surrounding said annular space (4) is constructed as integral die-cast part.

15. A drive according to claim 1, wherein said transmission casing (5) surrounds, in addition to said hydromotor (1), the mechanical gear transmission (3), said hydromotor and said transmission intercommunicate with said transmission casing by connecting openings (19, 40) so that said transmission casing (5) is both an additional oil sump (41) for said mechanical gear transmission (3) and a fluid reservoir for said filling pump (23) of said hydromotor (1).

16. A drive according to claim 15, wherein one said end wall (30) spatially separates said annular space (4) from said mechanical gear transmission (3).

17. A drive according to claim 16, wherein said end wall (30) is pressed on the gear side against sealing edges on said casing (5) and said inner connecting tube (11).

18. A drive according to claim 17 wherein one of said end walls is located axially and rotationally by means of an anti-twist element (42) in said transmission casing (5).

19. A drive according to claim 1, wherein said hydromotor (1) is held in said transmission casing (5) by means of a flange (10) constructed as valve block (14) and containing also a flushing valve that discharges in an annular gap (18) between said hydromotor (1) and said inner connecting tube (11).

20. A drive according to claim 1, wherein said transmission casing cooling surfaces comprise ribs (7).

21. In a hydrostatic drive comprising:
a transmission adjacent a hydromotor (1) in a transmission housing (5),
an annular space defined by a connecting pipe (11) that surrounds the hydromotor (1), having a central axis, the transmission casing (5) and first and second end walls (29, 30),
said annular space serving as a collecting and cooling container for a working fluid of the hydromotor which is at the same time a lubricant for the mechanical gear transmission,
said transmission casing (5) having cooling surfaces (7) in the area of said annular space (4) on the exterior thereof,
the improvement wherein said annular space includes a means for providing a single elongated flow path for said working fluid, which flow path progresses in alternating directions substantially parallel to said axis and commences at an only inlet chamber on the circumference of said hydromotor and extends in a meandering serpentine fashion substantially around the circumference of said hydromotor ending at an only outlet chamber, said flow path maintaining said working fluid in a heat transfer relation with both said hydromotor and said cooling surface, said flow channel providing complete working fluid flow through said annular space without allowing accumulation in the corners, and means for maintaining said annular space completely full with working fluid.

* * * * *